(No Model.) 2 Sheets—Sheet 1.
A. K. BONTA.
COMBINED CAR BRAKE AND FENDER.
No. 554,018. Patented Feb. 4, 1896.
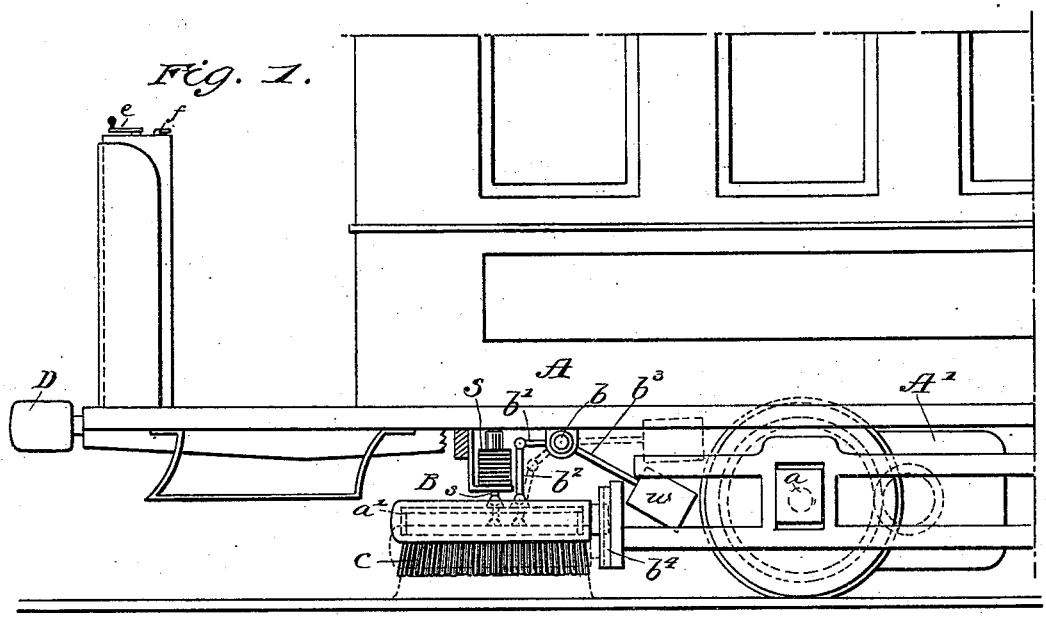
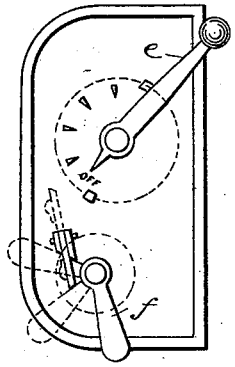
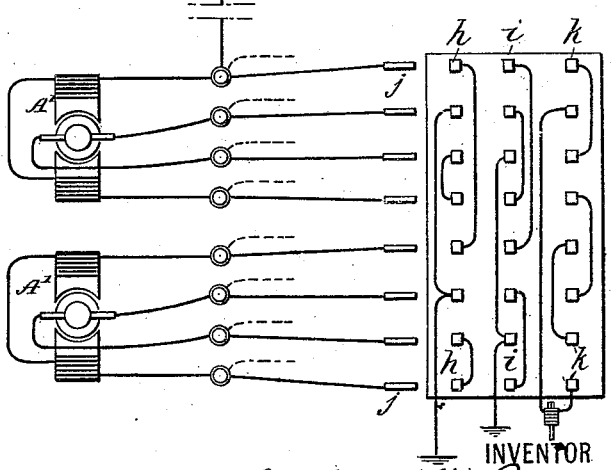
WITNESSES: Frank S. Ober. John Kraeger.
INVENTOR Arthur K. Bonta
BY Wm. W. Rosenbaum
ATTORNEY

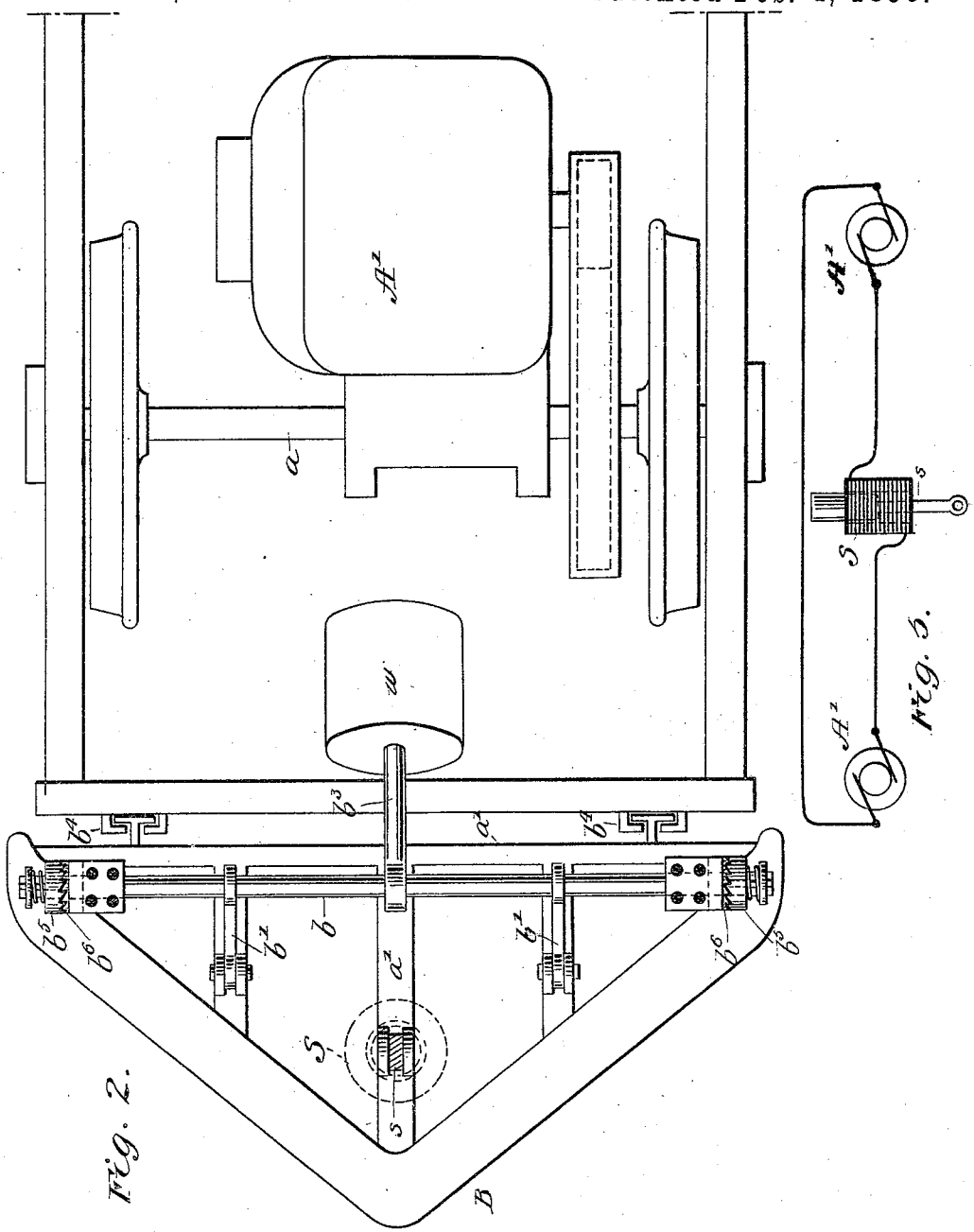

UNITED STATES PATENT OFFICE.

ARTHUR K. BONTA, OF HOBOKEN, NEW JERSEY, ASSIGNOR TO THE BONTA MANUFACTURING COMPANY, OF SAME PLACE.

COMBINED CAR BRAKE AND FENDER.

SPECIFICATION forming part of Letters Patent No. 554,018, dated February 4, 1896.

Application filed May 22, 1895. Serial No. 550,161. (No model.)

*To all whom it may concern:*

Be it known that I, ARTHUR K. BONTA, a citizen of the United States, residing at Hoboken, in the county of Hudson and State of New Jersey, have invented certain new and useful Improvements in a Combined Car Brake and Fender, of which the following is a full, clear, and exact description.

This invention is a combined brake and fender for railway-cars.

The object of my invention is to provide automatic means for throwing the fender close to or in contact with the surface of the roadbed simultaneously with the operation of an emergency-brake to quickly stop the car.

My invention consists in the means for accomplishing this object by electricity.

In my application, Serial No. 542,638, filed March 21, 1895, I have described an electric emergency-brake for electrically-propelled cars in which, when a quick stop is desired, the propelling motors are disconnected from the source of supply and connected together in a closed local circuit in which current is generated by the motors under the action of the momentum of the car. The motors thus acting as generators on a short circuit very quickly generate a large amount of current, and the resistance which the machines acting as generators thus offer to the movement of the car brings it to a stop very quickly. I have found that a brake of this character is very efficient, and that in much the larger number of instances a fender is not required at all. It is possible, however, that an obstruction may be so close to the car when it first appears that it is impossible to stop it in time to avoid running over it, and in such cases a fender is desirable.

I propose to make use of the current generated by the machines in the closed local circuit, as described in my application above referred to, to move or shift a fender from its normally-elevated position above the roadway down into contact with the roadway, where it is held with sufficient force to prevent any obstruction from passing under it. I mount the fender to be movable, vertically, and apply to it an electromagnet, solenoid, or other electromotive device connected in the local circuit and supplied with current by the propelling-motors when acting as generators. Thus the moment the motors are converted into generators the electromotive device connected with the fender becomes energized and the fender is thrust down to the ground. This takes place before the car comes to a stop, and the fender will therefore act as a supplementary safety appliance to the car.

My invention comprehends the operation of the fender by electrical means, whether it be in connection with the emergency-brake or not, and when so considered the power used may be taken from the main source of supply for the car, whether it be a trolley-wire or storage-battery.

If the invention is applied to a car propelled by other means than electricity, a separate source of current—such as a battery carried by the car or a small dynamo driven from the axle of the car—may be used to supply the current to operate the fender. I prefer, however, to operate the fender in connection with the emergency-brake herein described, for then the greatest efficiency as a safety appliance is obtained.

In the accompanying drawings, Figure 1 is a side elevation of a portion of a car, showing my fender applied thereto. Fig. 2 is a plan of the fender and portion of the car-truck. Fig. 3 is a plan of a type of controller for electric cars now commonly in use. Fig. 4 is a diagram of the circuits used in connection with my invention, and Fig. 5 is a simplified diagram of the same circuits.

A represents the car, preferably an electrically-propelled car, the propelling-motors being indicated at A'. They are suitably geared to the car-axles $a$ in the usual manner.

B represents the fender as here embodied and it is of the "pilot" or "cow-catcher" type, and consists of a triangular frame $a'$ with the apex pointing forward. I prefer to locate this fender underneath the car, directly forward of the wheels. It is supported by a rock-shaft $b$ mounted in bearings underneath the car, and from which project arms $b'$, supporting at their outer ends the fender by means of links $b^2$. On the opposite side of the rock-shaft an arm $b^3$ projects, and this carries a weight $w$, which slightly overbalances the weight of the fender.

The fender is adapted to raise and lower, and for this purpose suitable guideways $b^4$ are provided. These guides are attached to a rigid portion of the truck or framework, in order at the same time to serve as a brace against lateral movement of the fender. On the rock-shaft a ratchet-wheel $b^5$ is feathered to be engaged by a fixed ratchet $b^6$ to prevent the fender from rising after being once thrust downward.

Mounted above the fender in a central position is a solenoid S, the movable core of which is normally elevated. The lower end of the core is attached by a suitable link $s$ with the fender. When this solenoid is energized by an electric current the core is pulled downward, and the fender thereby thrust against the ground or road-bed, the weight $w$ being meanwhile lifted.

The front of the fender is made to stand substantially perpendicular with the road-bed, and the lower edge is armed with stiff reeds or wires $c$, forming a strong broom which when the fender strikes the ground will bend sufficiently to prevent the fender from breaking. At the same time it is sufficiently stiff to prevent any obstruction from passing under it.

In front of the dashboard of the car I place the projecting buffer D. This will be a suitable frame the face of which is provided with a cushion to prevent injuring a person or animal which it may strike. The function of this buffer is to strike an erect person or animal and throw it to the ground, so that the body may pass under the platform of the car without injury. The fender will then deflect the body from the roadway or will at least prevent its passage under the wheels. In case the fender itself is located ahead of the dashboard the buffer may not be necessary.

Fig. 3 illustrates a plan view of an ordinary type of car-controller usually located on the motorman's platform. On top of this controller are two levers $e$ and $f$, respectively, the former used to control the speed of the car, and the latter to change the connections of the motors in order to reverse the car. The reversing-lever $f$ connects with a small cylinder inside of the controller-casing, upon which are arranged two rows of contact-points $h$ and $i$, with which are adapted to engage a series of stationary fingers $j$. When the lever is turned to bring one row of points in contact with the fingers, the car moves forward, and when the other row of points is in contact with the fingers the car moves backward, the speed being regulated in each instance by the lever $e$. As described in my application heretofore referred to, I add to this reversing-cylinder a third row of contacts $k$, which when in contact with the fingers establishes a closed local circuit on the car in which the motors are connected in series and with the armature and field-magnet relation of each reversed. These changes of connection are of course accomplished by the different ways of connecting the contact-points of each row together.

Referring to the diagram Fig. 4, the connections between the points $h$ are such as to send the car, we will say, forward. The connections between the points $i$ will send the car backward, and the connections between the points $k$ will close the local circuit and make the field-magnet and armature relation of each motor reversed with respect to the relation which existed when the motors were propelling the car forward. In making the connections between the points $k$ I run out one of the conductors to the solenoid S, thus putting the solenoid into the local circuit with the motors.

The operation is as follows: When a quick stop is required, and there is need for the fender, the controller-lever $e$ is first thrown to the "off" position, (shown in the drawings,) thus severing the supply-circuit from the motors. The reversing-lever is then thrown to the position to bring the contacts $k$ into connection with the fingers $j$. The motors continue to rotate in the same direction by the momentum of the car, and they are thereby converted into generators supplying current to a circuit of very low resistance. The current will be maximum at first, because the momentum is greatest then, and gradually it will decrease as the car comes to a stop, which it will do within the distance of about one car length. The enormous current that is first generated will strongly energize the solenoid S, and the fender will thus be thrown downward against the road-bed with considerable force, where it will be caught and held by the pawl and ratchet $b^5$. The friction of the fender against the ground will aid in bringing the car to a stop. When the car is stopped and the obstruction removed, the pawl is removed from the ratchet and the fender rises to its normal position under the action of the counterpoise $w$.

My invention is not confined to the combination with an emergency-brake of the kind herein described, but is sufficiently comprehensive to include an electric circuit for the solenoid, adapted to be closed by the motorman either separately or in connection with a brake-operating device of any character. I may attach a circuit-closer to the lever of an ordinary mechanical brake and thus operate it simultaneously with the brake.

My invention obviously is not limited to the peculiar shape or type of fender herein described, as an ordinary scoop hinged at any point to the car and adapted to be thrown into contact with the roadway by an electromagnet comes within the spirit of my invention.

I claim an advantage in locating the switch which controls the flow of current through the electromotive device in the car-controller, for then the ordinary wires leading to the con- troller may be used for the solenoid-circuit and one of the regular switching devices (reversing-switch) may also be utilized.

I have referred herein to the use of a plurality of motors as generators supplying current to operate the brake and fender, but it will be understood that one or more motors may be used, and if the car is driven by two motors either one or both of them may be converted into a generator for the purpose of operating the fender.

Having thus described my invention, I claim—

1. A car-fender movable toward and away from the road-bed, in combination with an electromotive device adapted to force the same toward the roadway, an electric circuit including said electromotive device, and means for closing and opening said circuit.

2. A car-fender movable toward and away from the road-bed, in combination with an electromotive device adapted to force the same toward the roadway, an electric circuit including said electromotive device, and means located on the motorman's platform for closing and opening said circuit.

3. A car-fender movable toward and away from the road-bed, in combination with an electromotive device adapted to move the same and a source of electricity carried by the car and supplying current to said electromotive device.

4. The combination of a car-brake, a car-fender movable toward and away from the road-bed, and an electromotive device adapted to move said fender and energized automatically when the car-brake is operated.

5. The combination of a car, an electric circuit thereon, the current flowing in said circuit being used as a force to retard the motion of the car, an electromotive device in said circuit, and a car-fender movable toward the road-bed, the electromotive device being adapted to move the fender, substantially as described.

6. In an electrically-propelled car, the combination of a propelling motor or motors, a car-fender movable toward and away from the road-bed, an electromotive device adapted to move said fender, a local circuit including the motor or motors and the electromotive device, and means for disconnecting the motor or motors from their supply-circuit, closing the local circuit and driving the motor or motors as generators by the momentum of the car, thereby simultaneously retarding the car and moving the fender into operative position, substantially as described.

7. A car-fender normally located above the roadway and balanced in such position by a counterpoise in combination with an electromotive device adapted to overcome the counterpoise and force the fender into contact with the roadway.

8. In an electric car, the combination of a controller with which the movements of the car are controlled, a car-fender adapted to be moved into and out of operative position, an electromotive device arranged to move said fender, an electric circuit including the electromotive device and a switch located in the car-controller and adapted to close and open said circuit.

9. A car-fender movable toward and away from the road-bed, in combination with an electromotive device adapted to move the same, an electric circuit including said electromotive device, a circuit-controller in said circuit and a lock for the fender after it has been moved.

In testimony whereof I subscribe my signature in presence of two witnesses.

ARTHUR K. BONTA.

Witnesses:
WM. A. ROSENBAUM,
FRANK S. OBER.